United States Patent [19]
Park et al.

[11] Patent Number: 5,990,998
[45] Date of Patent: Nov. 23, 1999

[54] ACTIVE MATRIX LIQUID CRYSTAL DISPLAY AND RELATED METHOD

[75] Inventors: Jae-Yong Park, KyungKido; Jae-Kyun Lee; Jung-Hoan Kim, both of Pusan; Ki-Hyun Lyu, KyungKido; Kyu-Hyun Lee, Kyunggi-do, all of Rep. of Korea

[73] Assignee: LG Electronics Inc., Seoul, Rep. of Korea

[21] Appl. No.: 08/829,121

[22] Filed: Apr. 10, 1997

[30] Foreign Application Priority Data

Jun. 7, 1996 [KR] Rep. of Korea .................. 96-20300

[51] Int. Cl.[6] ......................... G02F 1/136; G02F 1/1343
[52] U.S. Cl. ..................... 349/139; 349/42; 349/143; 438/158
[58] Field of Search ..................... 349/38, 122, 143, 349/139, 42; 438/158

[56] References Cited

U.S. PATENT DOCUMENTS

| | | | |
|---|---|---|---|
| 4,933,296 | 6/1990 | Parks et al. | 438/158 |
| 5,032,536 | 7/1991 | Oritsuki et al. | 438/158 |
| 5,148,248 | 9/1992 | Possin et al. | 349/43 |
| 5,346,833 | 9/1994 | Wu | 438/30 |
| 5,478,766 | 12/1995 | Park et al. | 438/158 |
| 5,757,453 | 5/1998 | Shin et al. | 349/122 |
| 5,867,233 | 2/1999 | Tanaka | 349/43 |

*Primary Examiner*—William L. Sikes
*Assistant Examiner*—Dung Nguyen
*Attorney, Agent, or Firm*—Finnegan, Henderson, Farabow, Garrett & Dunner, L.L.P.

[57] ABSTRACT

A method of manufacturing an active matrix LCD is disclosed whereby gate bus lines, gate electrodes and source bus line segments are patterned from the same vacuum deposited first metal layer. An insulating layer, semiconductor layer, extrinsic semiconductor layer and second metal layer are then successively deposited on the substrate. A TFT channel region is formed by etching each of these layers in a second patterning process. During this step, storage capacitors may be formed by patterning the second metal layer so that it overlaps part of the gate bus lines. A transparent conductive layer is next deposited on the substrate. Pixel electrodes are then formed by patterning the transparent conductive layer in a third patterning process. Further, using a portion of the transparent conductive layer as a mask, the second metal layer and part of the extrinsic semiconductor layer are etched to form source and drain electrodes. Additionally, the transparent conductive layer can be patterned to provide an electrical connection between adjacent bus line segments to form a plurality of electrically continuous source bus lines.

26 Claims, 3 Drawing Sheets

ACTIVE MATRIX LIQUID CRYSTAL DISPLAY AND RELATED METHOD

BACKGROUND OF THE INVENTION

1. Field Of The Invention

The present invention relates to an active matrix liquid crystal display (AMLCD) and, more particularly, to a method for manufacturing an AMLCD incorporating a thin film transistor (TFT) as a switching element and the structure by the same method.

2. Background Of The Invention

A conventional AMLCD is illustrated in plan view in FIG. 1. The conventional AMLCD includes a plurality of horizontally extending gate bus lines (or scan lines) 113 and a plurality of vertically extending source bus lines (or signal lines) 123. A pixel is enclosed by each gate bus line 113 and source bus line 123. The pixel includes a pixel electrode 125 coupled to the drain electrode 123b of a switching element, such as a TFT. Gate bus line protrusions serve as the gate electrodes of the TFTs while extensions from the source bus lines constitute the source electrodes 123a of the TFTs.

FIG. 2 illustrates a cross-sectional view of TFT of the conventional AMLCD taken along line 2—2 in FIG. 1. The TFT is provided on a transparent glass substrate 111 and includes a gate electrode 113a patterned along with gate bus lines 113 after a first metal layer of aluminum is deposited on the substrate.

During the patterning process, the first metal layer is etched after a photosensitive resin is deposited thereon and developed using a conventional photolithography technique. Namely, the photosensitive resin is coated over the entire metal layer and exposed using a photomask having opaque and transparent regions corresponding to the desired pattern. After exposure, the exposed portions of the photosensitive resin are removed to reveal portions of the underlying metal layer. These metal portions are then etched so that the gate bus lines 113 and gate electrodes 113a are formed in accordance with the mask pattern. The photosensitive resin is then removed.

A gate insulating layer 115 including $SiN_x$ is next vacuum deposited onto the substrate, followed by a continuous deposition of a-Si semiconductor layer 117 and $n^+$ a-Si extrinsic semiconductor layer 119. These semiconductor layers are then etched in a second patterning process incorporating a similar photolithography technique as that described above. As a result, island portions are formed over each of the gate electrodes.

A second metal layer is next vacuum deposited onto the substrate, which is then etched in a third patterning process to form source bus lines 123, source electrodes 123a and drain electrodes 123b. During the third patterning process, a portion of the extrinsic $n^+$ a-Si layer between the source and drain electrodes is also etched.

A second insulating layer 127 of $SiN_x$ is then vacuum deposited over the entire substrate surface to protect the TFT. A fourth patterning process is next carried out to form a contact hole over drain electrode 123b.

Lastly, a transparent conductive film, such as ITO (Indium Tin Oxide), is vacuum deposited over the entire substrate, and patterned in a fifth patterning process to form pixel electrode 125 making an electrical contact with the drain electrode 123b through the contact hole.

Thus, numerous patterning steps, each requiring a photolithography process, are performed in order to fabricate the conventional AMLCD. Each photolithography process involves depositing a photosensitive film or photoresist, providing a photomask with a desired pattern, exposing the photosensitive film to a light, and developing the exposed photosensitive film. As a result of such numerous patterning steps, production yield becomes low, and fabrication of the conventional AMLCD is complicated, lengthy and expensive.

SUMMARY OF THE INVENTION

Certain disadvantages of the conventional AMLCD manufacturing process have been overcome by a method in accordance with the present invention. Gate bus lines, gate electrodes, and source bus line segments are patterned from a same vacuum deposited first metal layer in a first patterning process. An insulating layer, semiconductor layer, extrinsic semiconductor layer and second metal layer are then successively deposited on the substrate. A TFT channel region is formed by etching these layers in a second patterning process. During this step, storage capacitors may be formed by patterning the second metal layer so that it overlaps part of the gate bus lines.

A transparent conductive layer is next deposited on the substrate. Pixel electrodes are then formed by patterning the transparent conductive layer in a third patterning process. The transparent conductive layer can be patterned to provide an electrical connection between adjacent bus line segments to form a plurality of electrically continuous source bus lines. Further, using a portion of the transparent conductive layer as a mask, the second metal layer and part of the extrinsic semiconductor layer are etched to form source and drain electrodes.

The source bus line segments and gate bus lines, thus formed, constitute an in-plane structure because they lie in a same plane. Moreover, the multi-layered structure, including the insulating layer, the semiconductor layer, extrinsic semiconductor layer, and second metal layer, is preferably formed on the gate electrodes, selected portions of the gate bus lines, and edges of the source bus lines. Further, the transparent conductive layer connects source bus line segments together to form continuous source bus lines, and connects the TFT to the pixel electrode.

In accordance with the present invention, the number of patterning steps is reduced so that processing time is shortened and yield is improved.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DETAILED DESCRIPTION OF THE PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts.

Figure 1:
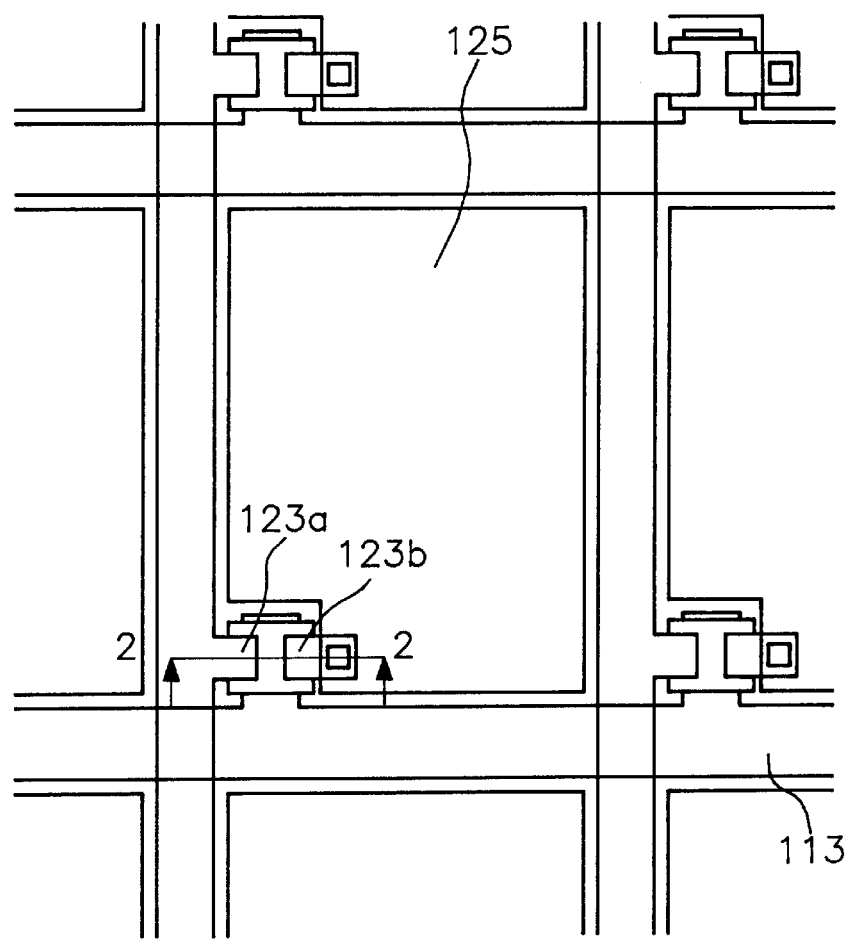
FIG. 1 is a plan view of a conventional AMLCD.
Figure 2:
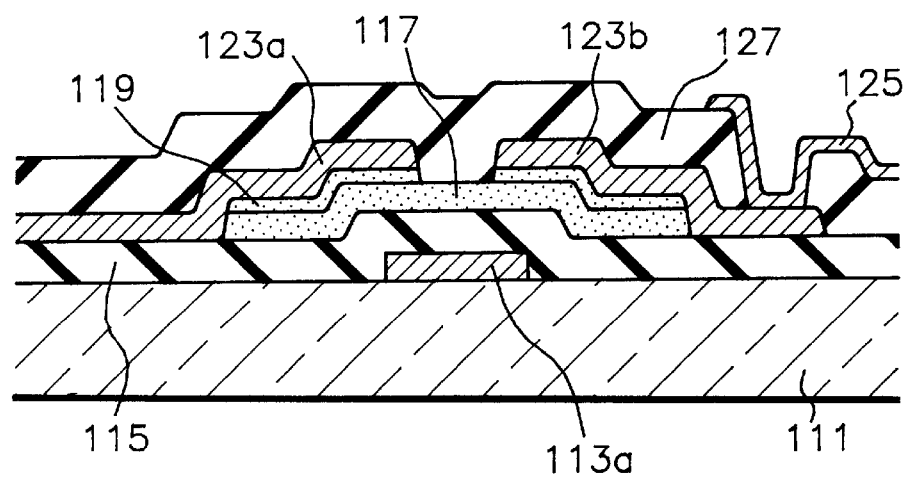
FIG. 2 is a cross-sectional view of a portion of the conventional AMLCD taken along 2—2 in FIG. 1.
Figure 3A:
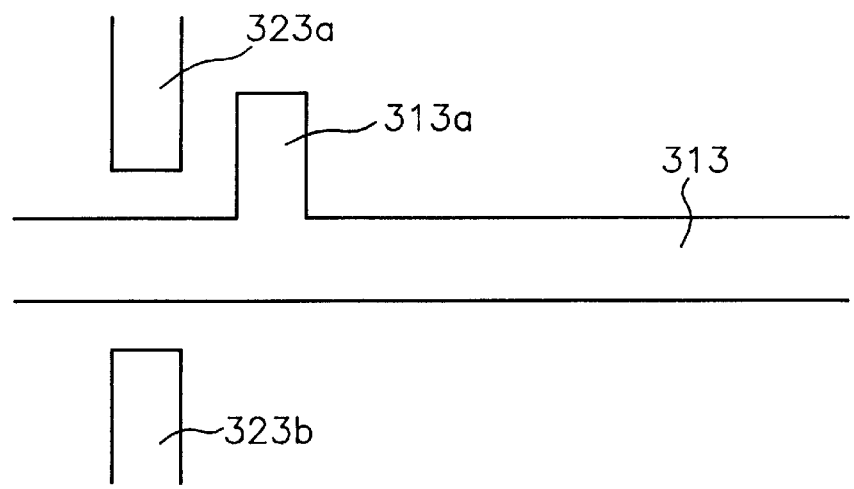
FIGS. 3A–3C illustrate enlarged plan views of a portion of an AMLCD at various steps of a manufacturing process in accordance with the present invention.

In accordance with the present invention, a first metal layer, such as aluminum or chromium, is deposited onto a transparent substrate. The first metal layer is then patterned in a single photolithography step to form gate electrodes 313a, gate bus lines 313 and source bus line segments 323a and 323b, as shown in FIG. 3A.

Figure 3B:
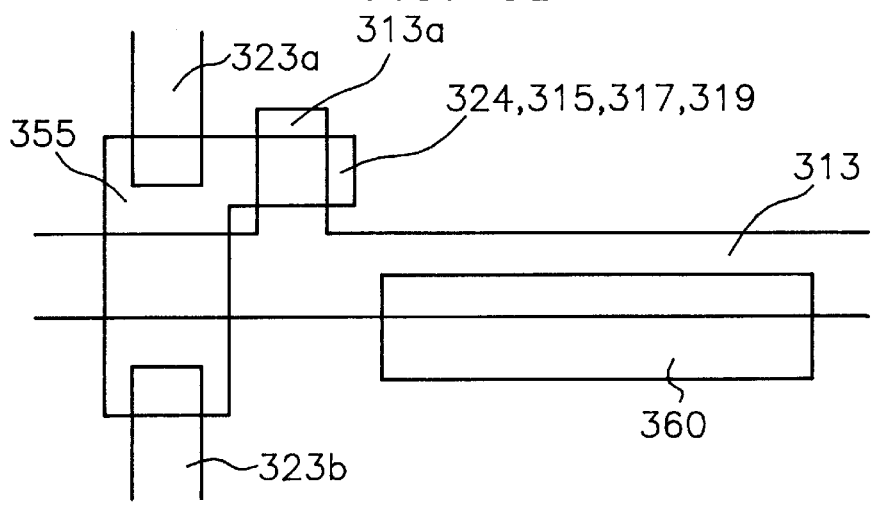

Next, an insulating layer 315, a substantially undoped a-Si layer 317 (a portion of which overlying the gate electrode constituting a channel region in the completed device), an extrinsic (phosphorus doped) n⁺ a-Si layer 319 and a second metal layer are successively deposited on the substrate, typically using a plasma enhanced chemical vapor deposition (PECVD) or sputtering process. These layers are then patterned to form islands 355 and 360 (see FIG. 3B), typically using a wet etch to remove portions of the second metal layer and a dry etch to remove portions of the remaining insulating layer 315, a-Si layer 317 and n⁺ a-Si layer 319. As seen in FIG. 3B, the island 355 overlaps portions of the source bus line segments 323a and 323b, the gate bus line 313, as well as the gate electrode 313a. Part of the island 355 will serve as the channel region in the completed device. The island 360 extends horizontally and overlaps a portion of the gate bus line 313 in order to form a part of a storage capacitor in the completed device.

Figure 3C:
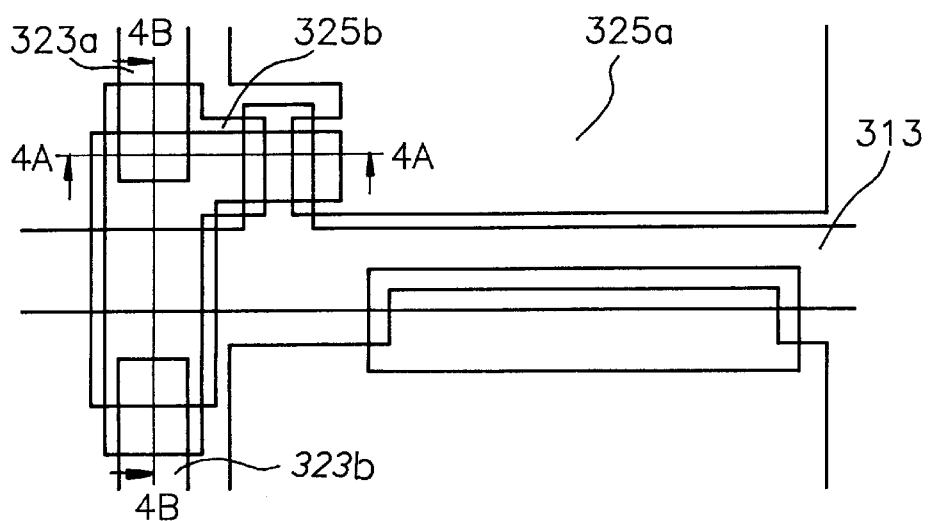

A transparent conductive layer, typically indium tin oxide, is generally sputter deposited over the entire substrate. Next, the transparent conductive layer is patterned, for example, in a photolithography process followed by an etch, to form a pixel electrode 325a and a connecting portion 325b to electrically connect source bus line segments 323a and 323b to form a continuous source bus line, as seen in FIG. 3C.

Figure 4A:
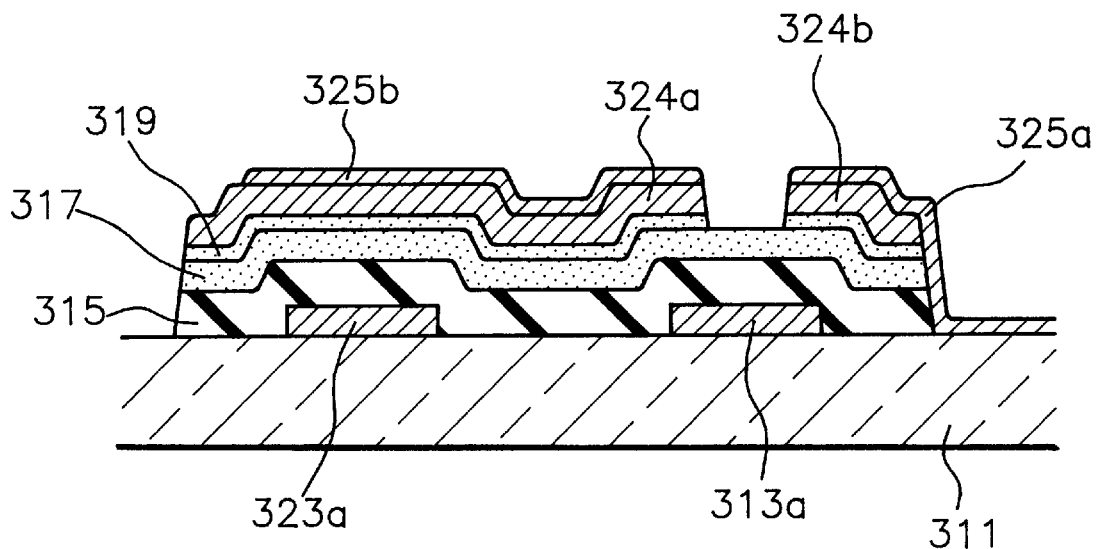
FIGS. 4A and 4B illustrate cross-sectional views taken along lines 4a—4a and 4b—4b, respectively, in FIG. 3C.
Figure 4B:
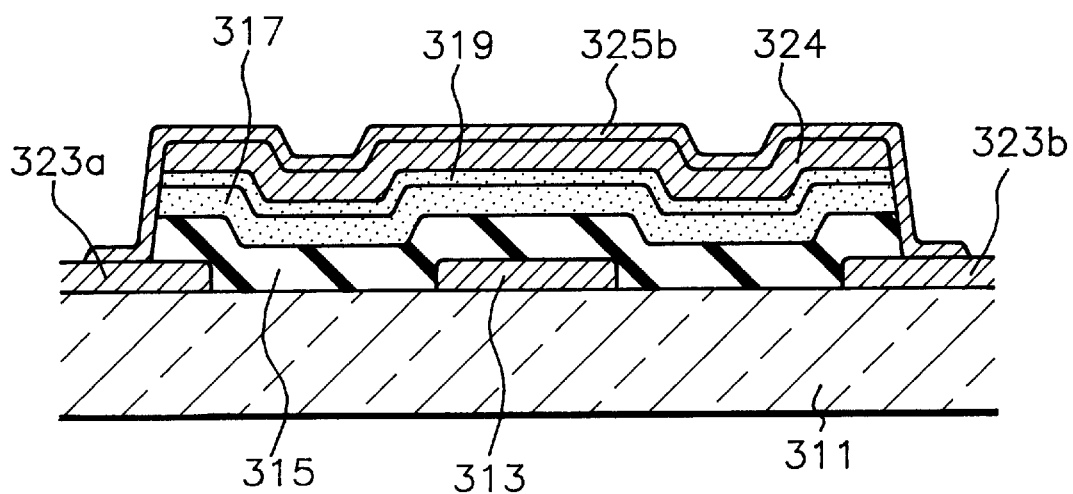

As shown in FIG. 4B, the transparent conductive portion 325b connects the source bus line segment 323a to the source bus line segment 323b over the island portion 355 (in FIG. 3B). Since the transparent conductive portion 325b is insulated from the gate bus line 313 by the insulating layer 315 of the island portion 355, the source bus line remains electrically isolated from the gate bus line even though portions of the source bus lines lie in the same plane as the gate bus lines.

As shown in FIGS. 4A and 4B, the transparent conductive portion 325b further connects the source bus line segments (e.g., 323a) to the second metal layer 324, thereby connecting the source bus line to the source electrode 324a of the TFT. In order to form separated TFT source and drain electrodes, however, it is necessary to perform an additional patterning process, whereby part of the second metal layer overlying the gate electrode 313a is exposed, and that part of the second metal layer and a corresponding underlying portion of the extrinsic n⁺ a-Si semiconductor layer 319 are removed to provide source and drain electrodes 324a and 324b, respectively. As further shown in FIG. 4A, pixel electrode 325a directly overlies and contacts drain electrode 324b without an intervening insulative layer. Thus, the patterning step required to form the contact hole for contacting the drain electrode in the conventional process, is not necessary in the process in accordance with the present invention.

Thus, in accordance with the present invention, the patterning steps are reduced. Yield, therefore, is improved and costs are reduced.

As discussed above, first metal segments of the source bus line are connected to each other by connecting portions made of a transparent conductive material, while the first metal gate bus lines extend uninterrupted through the AMLCD. The present invention, however, is not limited to this configuration. For example, it is also contemplated that the first metal source bus line extend uninterrupted through the AMLCD, while the gate bus line includes first metal segments connected to each other by the transparent conductive material.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A liquid crystal display device comprising:
   a transparent substrate;
   a first plurality of conductors on said transparent substrate extending in a first direction;
   a second plurality of conductors on said transparent substrate extending in a second direction substantially perpendicular to said first direction; and
   at least one of said first plurality of conductors including a plurality of segments, each said plurality of segments being connected to another one of said plurality of segments by a respective one of a plurality of interconnects, each including a third conductor provided on a fourth conductor.

2. A liquid crystal display device in accordance with claim 1, wherein said segments of said at least one of said first plurality of conductors include the same material as said second plurality of conductors.

3. A liquid crystal display device in accordance with claim 1, wherein said first plurality of conductors include source bus lines.

4. A liquid crystal display device in accordance with claim 1, wherein said second plurality of conductors include gate bus lines, each of which having a plurality of gate electrode protrusions extending therefrom.

5. A liquid crystal display device in accordance with claim 1, further comprising:
   a patterned transparent conductive layer overlying said first and second pluralities of conductors, first portions of said patterned transparent conductive layer corresponding to pixel electrodes of said liquid crystal display device, and a second portion of said patterned transparent conductive layer corresponding to said third conductor.

6. A liquid crystal display device in accordance with claim 5, further comprising a plurality of storage capacitors, each of which further comprising parts of said first portions of said patterned transparent conductive layer overlapping respective portions of said second plurality of conductors.

7. A liquid crystal display device in accordance with claim 1, wherein said second plurality of conductors and said segments of said at least one of said first plurality of conductors comprising a material selected from the group of aluminum and chromium.

8. A liquid crystal display device comprising:
   a substrate;
   a patterned first conductive layer provided on said substrate, first portions of said patterned first conductive layer corresponding to a gate bus line of said liquid crystal display device, and second portions of said patterned first conductive layer corresponding to respective segments of a source bus line of said liquid crystal display; and a plurality of interconnects respectively coupling adjacent ones of said source bus line segments, each of said plurality of interconnects including a second conductive layer disposed on a third conductive layer.

9. A liquid crystal display device in accordance with claim 8, further comprising a patterned transparent conductive layer overlying said third conductive layer, first portions of said patterned transparent conductive layer corresponding to a plurality of pixel electrodes, and a second portion of said patterned transparent conductive layer corresponding to said second conductive layer.

10. A liquid crystal display device, comprising:
   a substrate;
   a first metal layer formed on said substrate having first and second portions, said second portions being divided into a plurality of segments;
   an insulative layer provided on said first metal layer;
   a first semiconductor layer provided on said insulative layer;
   a second semiconductor layer provided on said first semiconductor layer having first and second portions overlying said first semiconductor layer;
   a second metal layer provided on said second semiconductor layer having first and second portions overlying said first and second portions of said second semiconductor layer; and
   a transparent electrode layer having a first portion in contact with said second portion of said second metal layer, said first portion of said transparent electrode layer corresponding to a pixel electrode and said second portion of said first metal layer corresponding to an interconnect, and said second portion of said transparent conductive electrode being provided on said first portion of said second metal layer to interconnect said plurality of segments.

11. A liquid crystal display device in accordance with claim 10, wherein said first portion of said first metal layer corresponds to a gate electrode of a TFT and said first semiconductor layer corresponds to a channel region of said TFT.

12. A liquid crystal display device in accordance with claim 10, said first semiconductor layer comprises a substantially undoped semiconductor layer and said second semiconductor layer comprises a doped semiconductor layer.

13. A liquid crystal display device in accordance with claim 10, wherein said first metal is selected from the group of chromium and aluminum.

14. A method of manufacturing a liquid crystal display device, comprising the steps of:
   depositing a first conductive layer on a surface of a substrate;
   patterning said first conductive layer to form continuous first bus lines in a first direction and spaced second bus line segments in a second direction, said first bus lines extending between adjacent ones of said spaced second bus line segments;
   depositing a second conductive layer on said substrate;
   patterning said second conductive layer;
   depositing a third conductive layer on said patterned second conductive layer; and
   patterning said third conductive layer, said patterned second and third conductive layers constituting an interconnect to couple said adjacent ones of said spaced second bus line segments.

15. A method of manufacturing a liquid crystal display device in accordance with claim 14, wherein said first bus lines comprise gate bus lines and said second bus line segments comprise source bus lines, said first bus lines each having a plurality of gate electrode protrusion extending therefrom.

16. A method of manufacturing a liquid crystal display device in accordance with claim 14, wherein prior to said steps of depositing a second and third conductive layers, said method further comprising the steps of:
   depositing an insulative layer on said substrate; and
   patterning said insulative layer to cover portions of said first bus lines between adjacent ones of said second bus line segments.

17. A method in accordance with claim 16, wherein said third conductive layer comprises a transparent conductive material, said third conductive layer patterning step includes a step of forming pixel electrodes.

18. A method in accordance with claim 17, wherein said third conductive layer patterning step further comprising the step of patterning said pixel electrodes to extend over portions of respective ones of said first bus lines, thereby forming a plurality of storage capacitors.

19. A method of manufacturing an active matrix LCD including a plurality of TFT switching elements, comprising the steps of:
   depositing a first metal layer on a substrate;
   patterning said first metal layer to form a plurality of gate bus lines, a plurality of source bus line segments and a plurality of gate electrodes;
   depositing an insulating layer on said substrate and said patterned first metal layer;
   depositing a substantially undoped semiconductor layer on said insulating layer;
   depositing a doped semiconductor layer on said undoped semiconductor layer;
   depositing a second metal layer on said doped semiconductor layer;
   patterning said insulating layer, said undoped semiconductor layer, said doped semiconductor layer, and said second metal layer to form islands overlying portions of said substrate between source bus line segments;
   depositing a transparent conductive layer on said substrate and said islands;
   patterning said transparent conductive layer to form pixel electrodes and connection portions on said islands respectively coupling adjacent ones of said source bus line segments, said patterned transparent conductive layer further exposing a portion of said second metal layer; and
   forming source and drain electrodes by removing said exposed second metal layer and a corresponding portion of said doped semiconductor layer.

20. A method in accordance with claim 19, wherein said step of patterning said insulating layer, said undoped semiconductor layer, said doped semiconductor layer, and said second metal layer forms additional islands overlapping respective ones of gate bus lines, and said transparent conductive layer patterning step further comprises the step of patterning said transparent conductive layer so that said pixel electrodes comprise portions respectively formed on each of said additional islands, thereby forming a storage capacitor.

21. An active matrix liquid crystal display, comprising:
   a substrate;

pluralities of source bus line segments and gate bus lines formed on said substrate, said gate bus line having at least one gate electrode protruding therefrom;

a plurality of insulating layer portions and undoped semiconductor layer portions selectively formed on said gate bus lines between adjacent ones of said source bus line segments;

a plurality of doped semiconductor layer portions respectively provided on said semiconductor layer portions each of said plurality of doped semiconductor layer portions including a gap dividing each of said plurality of doped semiconductor layer portions into first and second subportions;

pluralities of source and drain electrodes respectively formed on said first and second subportions;

a plurality of connector portions electrically coupling adjacent ones of said plurality of source bus line segments and providing an electrical connections to respective said source electrodes; and a transparent conductive layer, first portions of which corresponding to pixel electrodes in contact with respective ones of said drain electrodes, and second portions of said transparent conductive layer being formed on respective portions of each of said source electrodes to interconnect said adjacent ones of said plurality of source bus line segments.

22. A liquid crystal display device, comprising:

a substrate;

a source bus line provided on said substrate extending in a first direction, said source bus line including a plurality of spaced segments;

a gate bus line extending between adjacent ones of said spaced bus line segments, said gate bus line including a gate electrode protruding therefrom; and a conductive interconnect extending over said gate bus line to electrically couple said plurality of spaced source bus line segments.

23. A liquid crystal display device in accordance with claim 22, wherein said conductive interconnect further comprising:

a first conductive layer; and a second conductive layer provided on said first conductive layer.

24. A liquid crystal display device in accordance with claim 23, wherein said second conductive layer includes a transparent material.

25. A liquid crystal display device in accordance with claim 24, wherein a portion of said second conductive layer includes a pixel electrode of said liquid crystal display device.

26. A liquid crystal display device in accordance with claim 23, further comprising a storage capacitor including portions of said first and second conductive layers overlapping part of said gate bus line.

* * * * *